United States Patent [19]
Nishitani et al.

[11] 4,379,338
[45] Apr. 5, 1983

[54] ARITHMETIC CIRCUIT WITH OVERFLOW DETECTION CAPABILITY

[75] Inventors: Takao Nishitani; Yuichi Kawakami, both of Tokyo, Japan

[73] Assignee: Nippon Electric Co., Ltd., Tokyo, Japan

[21] Appl. No.: 209,250

[22] Filed: Nov. 21, 1980

[30] Foreign Application Priority Data

Nov. 22, 1979 [JP] Japan .............................. 54-151534

[51] Int. Cl.$^3$ ............................................. G06F 7/48
[52] U.S. Cl. ................................................. 364/745
[58] Field of Search ............... 364/745, 715, 736, 737, 364/768, 784, 786

[56] References Cited

U.S. PATENT DOCUMENTS

| | | | |
|---|---|---|---|
| 3,700,874 | 10/1972 | Heightley | 364/736 |
| 3,970,833 | 7/1976 | Gehweiler et al. | 364/786 |
| 4,215,415 | 7/1980 | Kanemasa et al. | 364/745 X |
| 4,223,389 | 9/1980 | Amada et al. | 364/745 X |

OTHER PUBLICATIONS

Drumm, "Saturation Adder Solves Overflow Problems in 2nd Order Filters" *Electronic Design* vol. 28, No. 18, Sep. 1, 1980, pp. 167–168.

Nguyen, "Practical Hardware Solutions for 2's Complement Arithmetic Problems" *Computer Design* Jul. 1979, pp. 105–112.

Ebert et al., "Overflow Oscillations in Digital Filters" *The Bell System Technical Journal* Nov. 1969, pp. 2999–3020.

*Primary Examiner*—David H. Malzahn
*Attorney, Agent, or Firm*—Sughrue, Mion, Zinn, Macpeak and Seas

[57] ABSTRACT

Overflow monitoring circuitry for an arithmetic unit offsets consecutive positive and negative overflows against one another to eliminate unnecessary overflow compensation during an arithmetic operation. In a first embodiment, an up/down counter is used to count positive overflows in one direction and negative overflows in another, with the value of the counter at the end of the arithmetic operation indicating the net overflow, if any has occurred, and the most significant bit of the counter representing the direction of any net overflow. In a second embodiment, logic circuitry offsets alternate positive and negative overflows against one another but will provide an overflow signal if either an odd number of overflows occurs or if two consecutive overflows in one direction occur during the arithmetic operation.

7 Claims, 5 Drawing Figures

ARITHMETIC CIRCUIT WITH OVERFLOW DETECTION CAPABILITY

BACKGROUND OF THE INVENTION

The present invention relates to an arithmetic circuit responsive to an overflow caused in consecutive addition or subtraction operation in digital signal or similar processing.

Digital signal processing is a technique to accomplish, in digital fashion, required filtering or similar processing for an input analog signal through analog-to-digital conversion. For details of such a technique, reference is made to *Theory and Application of Digital Signal Processing,* by Lawrence R. Rabiner et al. published in 1975 by Prentice-Hall, Inc., pp. 309–329 (Reference 1). The operation of a digital filter for use in such processing will be briefly described hereunder.

Generally, an analog filter of higher order may be replaced by a digital filter of the same order. To design such a digital filter without using such an analog filter of the same order, however, high coefficient accuracy is required for stable filtering operation. For this reason, such a filter is usually achieved by connecting second-order recursive digital filter in either cascade or parallel form. These second-order digital filters can be represented by the following equation:

$$w_k = x_k + \beta_1 w_{k-1} + \beta_2 w_{k-2}$$

$$y_k = w_k + \alpha_1 w_{k-1} + \alpha_2 w_{k-2} \qquad (1)$$

where $x_k$, $y_k$, and $w_k$ are an input signal sample value, an output signal sample value, and an internal state variable, respectively, at time k, and $\alpha_1$, $\alpha_2$, $\beta_1$ and $\beta_2$ are fixed coefficients determined by the frequency characteristics of the filter.

Alternatively, a stably operable non-recursive digital filter of higher order can be achieved without using the second-order digital filters by computing $$y_k = \sum_{i=0}^{N} C_i x_{k-i} \qquad (2)$$

by the use of the finite sample value sequence $[C_i | 0 \leq i \leq N]$ of impulse responses of an analog filter having corresponding characteristics.

For digital computation of equations (1) and (2), it is usual to use a simple arithmetic circuit of small hardware dimensions, in which two's complement-fixed point representation is employed for variable data such as $x_i$ and $y_i$. For details of the two's complement representation, reference is made to *Computer Science,* by Alfonso F. Cardenas et al. published in 1972 by John Wiley Sons, Inc., pp. 60–66 (Reference 2). For an efficient use of the word length for expressing the variables for said operations defined by equations (1) and (2), it is possible to set a dynamic range of the variables at (−1, +1), which means that the maximum and minimum values assumed by the use of a given word length correspond to +1 and −1, respectively. For instance, if each variable has a word length of four bits, the minimum value "1000" corresponds to −1 and the maximum value "0111" to $+1-2^{-3}$, which is close to +1. Thus, it can be understood that, by this notation, the most significant bit (MSB) represents the sign bit and the decimal point is located between the sign bit and the immediately following bit.

On the other hand, the above-mentioned coefficients must be so determined in designing said recursive or nonrecursive digital filter that the average level of the data-representing signal, which appears in each of the left-hand members of equations (1) and (2), may be contained within a dynamic range of (−1, +1).

Some overflow problems in the consecutive addition operation arise when such digital filters described above are achieved in hardware.

Let it be assumed that each term of the right-hand members in equations (1) and (2) comes within a predetermined range of (−1, +1). However, for instance, $\beta_1 w_{k-1}$ in equation (1) is not necessarily within this range because there can be the case of $1 \leq \beta_1 < 2$. In this case, the above-stated requirement can be satisfied by transforming the term into $$\beta_1 w_{k-1} = \frac{\beta_1}{2} w_{k-1} + \frac{\beta_1}{2} w_{k-1}$$

rendering each of the coefficients less than 1. Even with this transformation, however, a first problem is that even if said digital filter is designed so that the average level of said signal of each left-hand member in equations (1) and (2) is contained within the range of (−1, +1), such level may momentarily exceed the range. If the number of terms in each right-hand member is N, the value of the corresponding left-hand term may become N times greater than the normal dynamic range. Therefore, by the above-stated representation of the variables in which only the sign bit is present above the decimal point, a momentary overflow in the operation may occur. Unless an interim result of the operation is corrected to the maximum value on either the positive or the negative side depending on whether the overflow has arisen on the positive (plus) or the negative (minus) side, an error nearly equal to the full dynamic range (an error of about 2) will occur. Such correction, in response to the overflow, is indispensable to the operation of the digital filter defined by equation (1). If a large error occurs for the internal variable $w_k$, which is calculated based on the internal variables $w_{k-k}$ and $w_{k-2}$, a comparatively large error will also occur for the following internal variable $w_{k+1}$. Thus, subsequent internal variables will continue to store errors permanently, resulting in an unstable filtering operation. In the case of equation (2), on the other hand, since the internal variables are not affected by the overflow, there is little direct effect of the overflow even if it is not compensated for. Although this type of filter is often used for the case where a correlation is taken, a control system responsive to the extent of said correlation will be seriously affected, if the correlation substantially deviates from what it should be.

The second problem is caused due to the overflow that may occur in the course of the calculation of the right-hand members in equations (1) and (2). For instance, if an overflow occurs on the positive side in the course of the calculation, the overflow may be immediately compensated for, but in many instances it may be unnecessary to perform such overflow compensation. More particularly, each data signal is selected so that the average level of each signal of the left-hand members may lie within the proper dynamic range (−1, +1). For this reason, there will be a sufficiently high probability that for each overflow in the positive direction, an overflow will arise on the negative side to eventually hold the level within said range. Thus, even though a number of overflows may actually occur, the positive and negative overflows will offset one another in the course of the operation and the ultimate result will be free from overflow error.

To achieve such digital filtering or similar processing, a prior art arithmetic circuit employs only one adder as illustrated in FIG. 2-1, page 2-1 of *MCS-85 User's Manual*, published in 1978, by Intel Corporation (Reference 3). The FLAG FLIP-FLOPS, ARITHMETIC LOGIC UNIT, TEMP. REG. AND ACCUMULATOR shown in FIG. 2-1 of reference 3 constitute the arithmetic circuit. In such an arithmetic circuit, the above-mentioned overflow is dealth with by the following two methods.

The first is to shift the decimal point to a lower position. In the case of N consecutive additions, for example, the decimal point is shifted to the location between the $\lfloor \log_2 N \rfloor$-th bit and the $(\lfloor \log_2 N \rfloor + 1)$-th bit from the MSB, where the symbol $\lfloor \; \rfloor$ indicates a Gaussian notation, which means that a value written within this symbol becomes an integer closest to the value by counting its decimal fraction as one. According to this method, even if an overflow occurs so that the dynamic range $(-1, +1)$ is surpassed as discussed with respect to said first problem, the adder used in the arithmetic unit will never cause the overflow. This is because only data up to at most the $\lfloor \log_2 N \rfloor$-th bit above the decimal point is generated. Whether or not the result of the consecutive additions has overrun the proper dynamic range $(-1, +1)$ can be judged by examining whether or not every bit above the decimal point is identical with the MSB. If any signal is found beyond said dynamic range, the overflow can be compensated for as described above.

This method is also effective to cope with said second problem. Since it serves to expand the dynamic range of the arithmetic unit, values not smaller than $+1$ or not greater than $-1$ can be maintained within one arithmetic register, even if any interim result of the operation exceeds the dynamic range of $(-1, +1)$. Consequently, if any result of the operation is within said range of $(-1, +1)$, it can be decided that said result has been calculated without error. Also, even if the overflow occurred in any interim result, the final result will be judged free from the overflow by said first method.

A disadvantage, however, is that this method cannot fully utilize a given word length. For instance, when eight consecutive additions are accomplished by an arithmetic circuit capable of processing data of 16 bits in word length, the decimal point is shifted to the third (i.e., $\log_2 8 = 3$(rd)) bit from the MSB. It follows consequently that the four most significant bits out of the 16-bit word length are used merely for the detection of overflow as well as the compensation therefor, or, in other words, the 16-bit word length processing unit is actually employed as a 12-bit word length unit.

The second method is to correct the result of the operation every time the overflow occurs, even in the course of the consecutive addition (CA) operation, to the maximum permitted value in the direction of the occurrence of the overflow (the positive or negative side). By this method, any error that may occur in the event of overflow will be smaller than in the case where the overflow is not compensated for. Therefore, the second method is efficient to prevent the unstable operation of a second-order digital filter even if the overflow occurs in the calculation of the internal state $w_k$ in equation (1). For further details of this stabilized digital filter, reference is made to a paper by Stanley L. Freeny, entitled "Special-Purpose Hardware for Digital Signal Processing", PROCEEDINGS OF THE IEEE, April issue, 1975, pp. 633–648 (Reference 4).

The second method, however, necessitates the checking of overflow upon every addition. Moreover, if applied to equation (2), which is used for the non-recursive digital filter or correlation calculation, a correction error will be accumulated every time the overflow occurs in the course of the CA operation. For this reason, the result of the operation must be corrected to the maximum value in response to the overflow. This corrected result of the CA operation, even though it is within said dynamic range $(-1, +1)$, may consequently contain a large error component if the value of N is large.

The detection of any overflow that arises in a single addition can be carried out by either of the following two checking methods:

(1) The sign bits of the two data are checked before the addition to determine whether they are identical as well as whether the sign bit of the output data is different from them (see page 636 of Reference 4);

(2) The carry signal input to the MSB (i.e., the sign bit in this instance where two's complement representation is used) is checked to determine whether it has a different sign from the carry signal output. For details of this method (2), reference is made to *The Am2900 Family Data Book with Related Support Circuits*, published in 1976 by Advanced Micro Devices, Inc., p. 11 (Reference 5).

SUMMARY OF THE INVENTION

One object of the present invention is, therefore, to provide an arithmetic circuit capable of detecting an overflow only when the correct result of the CA operation overruns the dynamic range $(-1, +1)$ without expanding the length of data handled.

In one embodiment according to the present invention, an up/down counter counts the positive overflows in one direction and the negative overflows in the opposite direction, and the value of the counter at the end of the arithmetic operation will indicate whether or not any net overflow has occurred. If the counter does indicate the existence of a net overflow, the most significant bit of the counter, i.e. the sign bit, will indicate the direction of the net overflow. In a second embodiment, a few simple flip-flops and logic gates are used to monitor the overflow in such a manner that, if the total number of overflow errors is even and if no two consecutive overflows occur in the same direction, no net overflow will be indicated. However, if two consecutive errors occur in the same direction, the logic circuitry will indicate that an error has occurred in this direction. Further, if an odd number of errors occurs during the arithmetic operation, even if the positive and negative overflows are interleaved, the logic circuitry will indicate that a net overflow error has occurred, and it will also indicate the direction of the last-occurring overflow.

BRIEF DESCRIPTION OF THE DRAWINGS

The present invention will be described in further detail hereunder with reference to the accompanying drawings, wherein.

In all these drawings, the same reference numerals represent respectively the same structural elements. Reference numerals shown in the left-hand parts of FIGS. 3 and 5 refer to the input-output waveforms of the corresponding structural elements.

DETAILED DESCRIPTION OF THE PREFERRED EMBODIMENTS

The invention utilizes the property of numerical values represented in two's complements that even if an overflow occurs in the positive or negative direction during the CA operation, said values return to values within the normal dynamic range of $(-1, +1)$ when an overflow occurs in the opposite direction during further additions, and no compensation for the first overflow is necessary.

Figure 1:
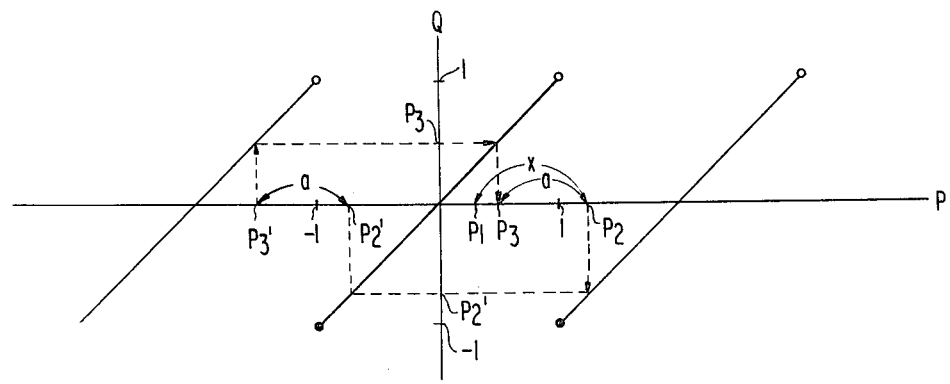
FIG. 1 is a diagram illustrating the principle of the invention.

The relationship between a numerical value P represented in two's complement (referred simply to as "TC") and another value Q which emerges as a result of an overflow occurring when P exceeds the range of $(-1, +1)$ is shown in FIG. 1. This relationship is obvious from the fact that, in TC representation, the addition of the least significant bit (LSB) to the maximum value on the positive side gives the maximum value on the negative side. Now suppose that an interim result of the CA operation is a value represented by $P_1$ in FIG. 1, for instance, a four-bit value $P_1 = 0.110$, and that a positive value x (for instance, x = 0.101) is added next to cause an overflow in the positive direction to give the value $P_2$. $P_2$ greater than 1 and including the sign bit is 01.011 in five-bit expression. At this time point, the value of Q is equal to $P_2'$ ($P_2' = 1.011$) and, as a result of overflow, the next consecutive addition is effected for $P_2'$ on the axis P. It is to be noted that although $P_2$ herein is a positive value, $P_2'$ is negative. If a negative value a (for instance, 1.010) is further added, an overflow will arise in the negative direction to give the value $P_3'$. $P_3'$ smaller than $-1$ is 10.101 in fivebit expression like $P_2$. The value of Q corresponding to $P_3'$ is $P_3$ ($P_3 = 0.101$). It is to be noted that $P_3$ is a positive value. As is evident from FIG. 1, adding a (11.010 in five-bit expression) to $P_2$ (01.011) on the axis P without taking the overflow into account will also give the identical result $P_3$ (00.101, the same as the four-bit expression of 0.101). In general, in a system based on TC representation, there is a periodical relationship between the true value P of the result of the CA operation and the value Q, that is, the result of the CA operation including overflows, as shown in FIG. 1. As a result, if the overflow occurs m times in the positive direction and n times in the negative direction during the CA operation, processing can be considered to take place in a dynamic range of $(2k-1, 2k+1)$ ($k=m-n$), although the operation including the overflows is accomplished in the dynamic range of $(-1, +1)$ in the arithmetic circuit. Thus, if k and Q are given, the true value of P can be obtained by equation $$P = 2k + Q.$$

Therefore, if as many overflows occur in the positive direction as in the negative direction during the CA operation, the result of the CA operation can be expected to return to a correct value in the dynamic range of $(-1, +1)$ even if it temporarily deviates therefrom. As a result, if the number of positive and negative overflows during the CA operation are equal to each other, the result of the CA operation can be judged free from the overflows. If they are not equal, it can be judged that the overflow occurred in the direction where the counted number is greater.

Figure 2:
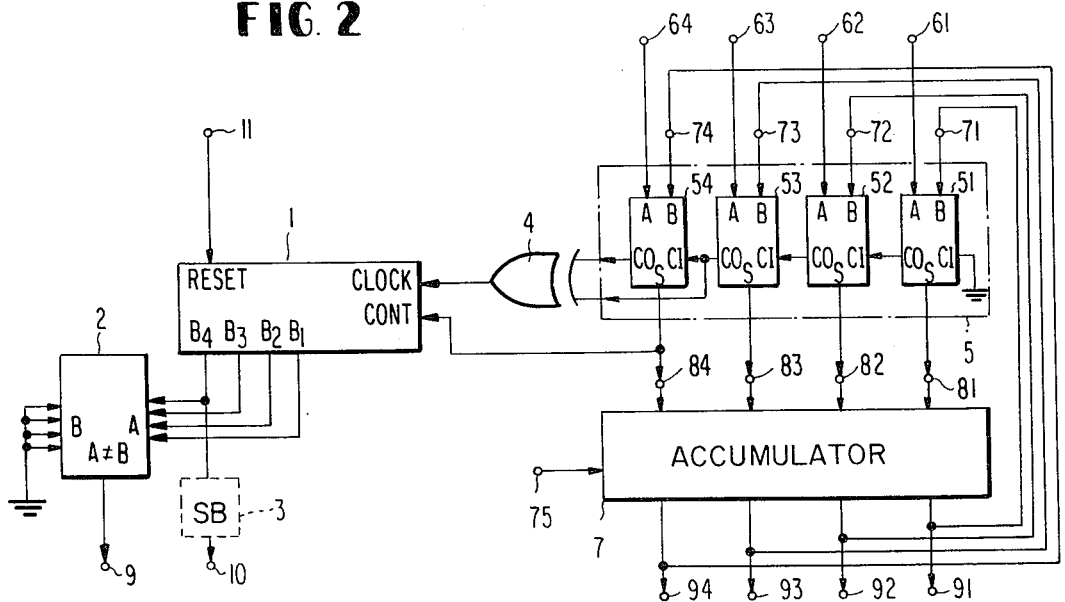
FIG. 2 illustrates a first embodiment of the invention.

One embodiment of the invention illustrated in FIG. 2 includes an up-down counter 1, a zero detecting circuit 2, a sign bit detecting (SBD) circuit 3, a single overflow detector 4, an adder 5 composed of full adders 51, 52, 53, and 54, an accumulator 7, addition-data input terminals 61, 62, 63, and 64 (the MSB of data is fed to the terminal 64), further addition-data input terminals 71, 72, 73, and 74 (the MSB of data is fed to the terminal 74), addition-result output terminals 81, 82, 83, and 84 (the MSB of data is supplied from the terminal 84), arithmetic-result output terminals 91, 92, 93, and 94, an overflow output terminal 9, an output terminal 10 for the circuit 8, a reset terminal 11 of the counter 1, and a reset terminal 75 of the accumulator 7.

The up-down counter 1, the zero detecting circuit 2, the full adders 51-54, and the accumulator 7 may be composed of the types respectively described on pp. 417–426, pp. 202–208, pp. 396–397, and pp. 363–368 of *The TTL Data Book for Design Engineers*, published in 1973 by Texas Instruments (Reference 6). In the full adders 51-54, terminals A, B, S, CI, and CO represent an input terminal for receiving an addition-data bit, an input terminal for receiving another addition-data bit, an output terminal for giving the result of addition, an input terminal for receiving a carry bit, and an output terminal for giving a carry bit, respectively. The up-down counter 1 is counted up in the positive direction when a signal "1" is fed to a terminal CONT and counted down in the negative direction when a signal "0" is fed to the terminal CONT. Also, a terminal CLOCK is an input terminal for having the counter 1 count up or down by "1" in the direction set by the terminal CONT; terminals B1, B2, B3, and B4 are output terminals to supply the content of the counter (out of the data contained in the counter 1, the LSB is supplied from B1 and the MSB from B4); and a terminal RESET is a terminal to clear the content of the counter 1. The sign bit detecting circuit 3 is a circuit for outputting the MSB from the up-down counter 1 directly, and the single overflow detector 4 is an Exclusive OR (EOR) gate for detecting overflow data based on the technique described in Reference 5. Namely, this technique is used to detect an overflow when a carry input signal given to the terminal CI of the adder 54 and a carry output signal supplied from the terminal CO of the same adder are different from each other. With the present invention, a signal appearing at the terminal 9 is "1" when a net overflow occurs, while data appearing at the terminal 10 shows the direction of the net overflow. For instance, "0" appearing at the terminal 9 indicates a net overflow in the positive direction and "1" indicates a net negative overflow.

To contrast the present circuit with, for instance, the circuit illustrated in FIG. 2-1 of Reference 3, the terminals 61, 62, 63, and 64 correspond to the outputs of the TEMP. REG.; the adder 5 corresponds to the ALU; the accumulator 7 to the ACCUMULATOR; and the terminals 91, 92, 93, and 94 and the path connected from the accumulator 7 to the adder 5 to the 8 BIT INTERNAL DATA BUS (the terminals 9 and 10 of the circuits 2 and 3 used in the present invention are led to the FLAG FLIP-FLOPS of Reference 3).

Figure 3:
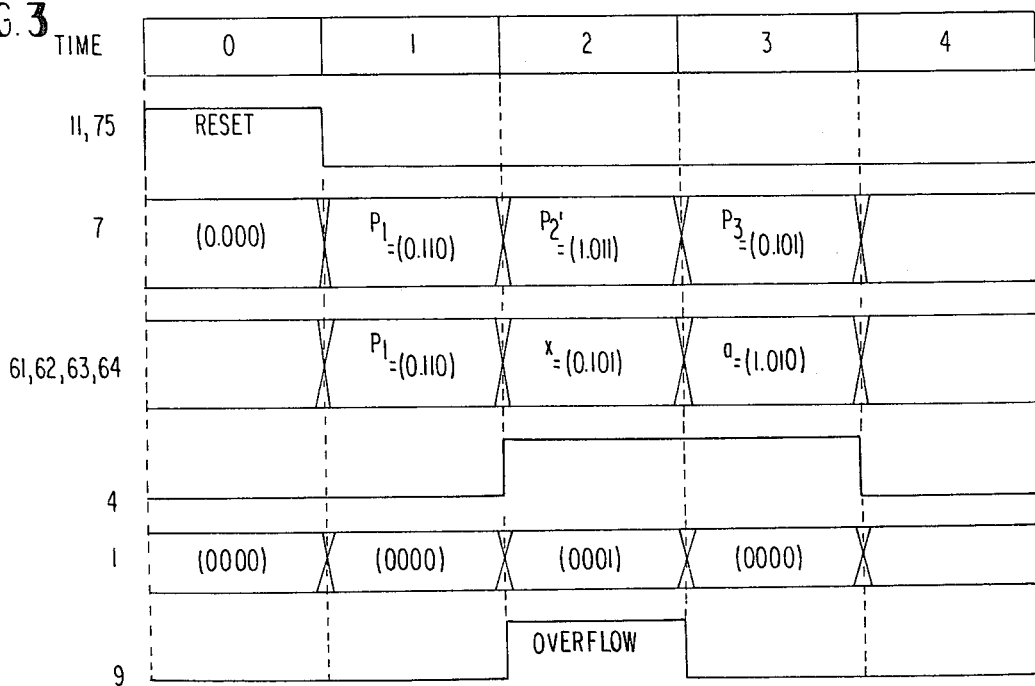
FIG. 3 is a diagram showing the input-output relationship of a part of the circuit of FIG. 2.

The operation of the present invention will be described hereunder with reference to FIGS. 1, 2, and 3, using the example of the calculation of $P_1+x+a$, which has been referred to in describing the principle of the invention. To start the CA operation, reset (clear) signals are fed to the terminals 75 and 11 at time 0 (see FIG. 3) to set the contents of both the counter 1 and the accumulator 7 to zero.

The first addition, which takes place at time 1 between zero value stored in the accumulator 7 and a value ($P_1=0.110$) supplied to the terminals 61–64, gives rise to no overflow, and the value corresponding to $P_1$ in FIG. 1, fed to the terminals 61–64, is fed into the accumulator 7. At this time point, zero is being fed to the terminals 71–73, and input data corresponding to $P_1$ are being supplied to the terminals 61–64. As a result, only a signal "0" is given to the carry input terminal CI from the carry output terminal C0 of each full adder. The output of the overflow detector 4 (consisting of an EOR gate) is "0" as shown in FIG. 3, so that the value in counter 1 remains at "0". In this single addition, the overflow detection is achieved by the present circuit in the following manner. The content "0" of the counter 1 is fed to the comparison terminal A of the zero detecting circuit 2 to be compared with the all "0" pattern fed to the comparison terminal B. Since the two input values given to the terminals A and B are identical with each other, "0" appears at the terminal 9 to indicate the occurrence of no overflow.

Next will be considered a consecutive addition at time 2 (see FIG. 3), when a value x (0.101) is added to $P_1$ (0.110) of the accumulator 7 as referred to in the description of the principle of this invention. Since both $P_1$ and x are positive values, their MSB's, which are the sign bits, are zero. Accordingly, the signals fed to the terminals A and B of the full adder 54 are "0" and the CO signal supplied to gate 4 from adder 54 is "0". Therefore, if the carry signal supplied from the full adder 53 to the full adder 54 is "1", the result of addition of $P_1$ and x is subjected to overflow. At this time, "1" is produced from the sum output terminal S of the full adder 54, while "0" is produced from the carry output terminal CO of the adder 54. The overflow detector 4 gives the Exclusive OR of the carry input signal "1" and the carry output signal "0" of the full adder 54 and, as illustrated in FIG. 3, supplies "1" as its output, thereby to indicate the occurrence of the overflow. Simultaneously, whereas "1" (indicative of a negative sign) is given from the sign bit output terminal 84 of the terminals 81–84 for supplying the result of addition, this value, which has resulted from the overflow, indicates that the overflow has occurred in the positive direction. Further, since "1" is fed to both the terminals CLOCK and CONT of the counter 1, the counter is counted up by "1" to make its content "1" as shown in FIG. 3. This content is, consequently, judged to be not identical with zero by the zero detecting circuit 2 with the result that "1" appears at the terminal 9 as illustrated in FIG. 3, thereby to indicate the occurrence of the overflow. Moreover, because the content of the counter 1 is "1", the output of the sign bit detecting circuit 3, which extracts the MSB of the counter 1, is zero so as to indicate the occurrence of the overflow in the positive direction. The operation of this addition causes the accumulator 7 to store the overflow value, which is a negative value represented by $P_2'$ (1.011) of FIG. 1. The correct result of the accumulation can be obtained by the use of equation (3) mentioned above. The value indicated by the counter 1 is k and the content of the accumulator 7 is Q, respectively.

Next, the consecutive addition at time 3 is performed for the case where a value a (1.010) is added to $P_2'$ (1.011) of the accumulator 7. Since both $P_2'$ and a are negative values, their sign bits are "1". Therefore, "1" is fed to the terminals A and B of the full adder 54 to produce "1" at the carry output terminal CO. The full adder 53 generates "0" at its terminal CO, since lower bits below the MSB of each of said negative values have successive zeros in TC representation when these values are large. As a result, "0" appears at the addition output terminal S of the full adder 54 to perform the addition of the sign bits to give the addition result to have a positive value. At this time, the detector 4, as shown in FIG. 3, gives an output "1", which is the Exclusive OR of the carry input signal "0" and the carry output signal "1" of the adder 54. Consequently, to the terminals CONT and CLOCK of the counter 1 are respectively suppled "0" which appears at the terminal S of the full adder 54 and "1" which is the output of the overflow detector 4, so that the counter 1 is counted down by "1". Since the content of the counter 1 previously was "1", this countingdown operation makes the content of the counter 1 zero as shown in FIG. 3. As a result, because of the content of the counter 1 is zero, the circuit 2 gives a "0" output to indicate that the result of the CA operation is free from any error attributable to the overflow.

As described above, even though the overflow in the positive direction occurs during the CA operation, it will not be detected as the overflow if followed by another in the negative direction. Also, when the overflow occurs, the output of said detecting circuit 3 can judge whether the overflow is in the positive or the negative direction. Given an N-bit up-down counter, if overflowing in each direction occurs less than $2^{N-1}-1$ times, the output of the circuit 3 can properly function.

As stated above, the present circuit for the CA operation does not detect any overflow if the final result of the CA operation is free from the overflow, which occurred during the CA operation, because the correct answer is obtained in the accumulator 7. The finally detected overflow is indicated whether it is in the positive or the negative direction. Accordingly, if the present circuit is used for a processor to achieve the above-described digital signal processing (for instance, such a processor as the one illustrated in FIG. 2-1 of Reference 3), a stable second-order recursive digital filter can be achieved by merely adding a simple circuit without decreasing the data length for the arithmetic unit. The application of the present invention to a non-recursive digital filter or a correlator using this digital filter also enables the reduction of errors in the operation of the filter and correlator.

Although the present invention has been heretofore described with respect to the CA operation, it can as well be applied to the overflow detection in the consecutive subtraction operation for the subtractor.

Figure 4:
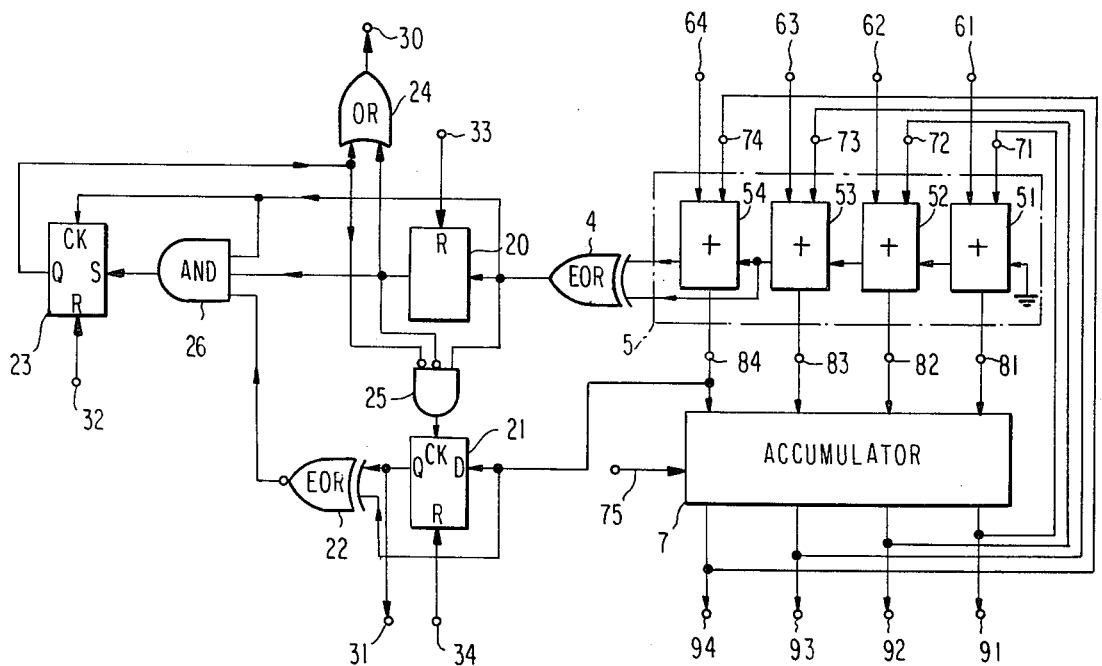
FIG. 4 illustrates a second embodiment of the invention.

Next will be described in detail a second embodiment of the present invention referring to FIG. 4.

The second embodiment comprises a single overflow detector 4, an adder 5 composed of full adders 51, 52, 53, and 54, an accumulator 7, addition-data input terminals 61, 62, 63, and 64, further addition-data input terminals 71, 72, 73, and 74, addition output terminals 81, 82, 83, and 84, arithmetic result output terminals 91, 92, 93, and 94, an auxiliary memory 20 for the overflow detection, a sign bit memory 21, an overflow occurrence memory 23, an Exclusive OR gate 22, AND gates 25 and 26, an OR gate 24, output terminals 30 and 31, and reset terminals 32, 33, 34, and 75. It is to be noted that each circle attached to the gates 25 and 22 means the inversion of a signal given thereto.

In this embodiment, the memory 23 is an R-S flip-flop and the memory 21 is a D-type flip-flop. Said R-S flip-flop and D-type flip-flop may be composed of the ones described, respectively, on pages 128 and 129 of Reference 6. The memory 20 is a one-bit counting circuit, which is composed of the one described on pp. 224–229 of Reference 6.

It will be described hereunder how the second embodiment is responsive to an overflow occurring during the CA operation, referring to FIGS. 1, 4, and 5.

Figure 5:
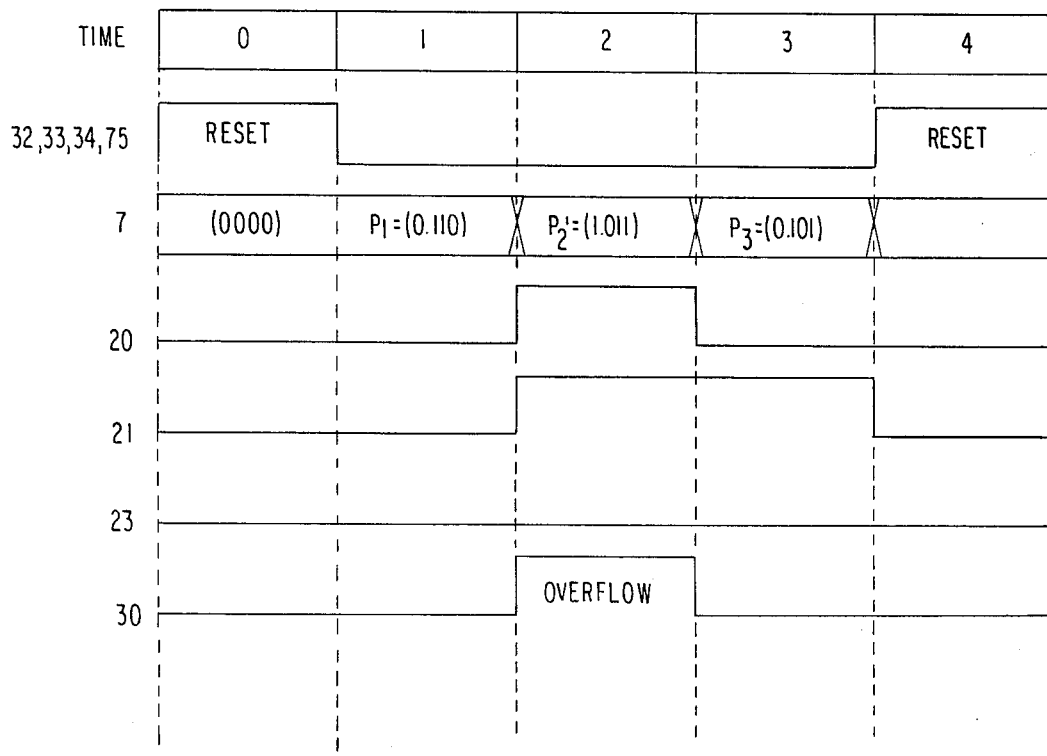
FIG. 5 is a diagram showing the input-output relationship of a part of the circuit of FIG. 4.

To carry out the CA operation, reset signals are fed to the terminals 75, 32, 33, and 34 at time 0 to clear the accumulator 7, the overflow occurrence memory 23, the auxiliary memory 20 and the sign bit memory 21 (see FIG. 5).

The first addition takes place at time 1 between the zero value of the accumulator 7 and a value $P_1$ (0.110) supplied to the terminals 61–64 with the result that no single overflow is caused. At this time point, the outputs of the detector 4 and said memory 20 remain at "0". As a result, the gate 25 is closed, so that nothing is written into the memory 21. The gate 26 is closed, because the memory 20 remains at "0", and the overflow occurrence memory 23 also remains at "0". Consequently, the gate 24 gives a zero output, thereby to indicate the absence of any overflow in the CA operation. As a result of this addition, the value corresponding to $P_1$ in FIG. 1, which has been fed to the terminals 61–64, is stored in the accumulator 7.

Next will be considered the consecutive addition at time 2, when a value x is added to $P_1$ of the accumulator 7 as referred to with respect to FIG. 1. At this time, as stated with respect to the first embodiment, the adder 5 is in a state of overflow in the positive direction, causing the single overflow detector 4 to indicate "1" and the terminal 84 to give an output of "1".

The contents of the memories 20, 23, and 21 are consequently changed as follows. First, it is to be noted that before each memory is changed, gate 25 is opened in response to the output "1" from the detector 4 and the outputs "0" from the memories 20 and 23 and gate 26 is closed because of the output "0" from the memory 20. Accordingly, the contents of said memories are changed in the following manners. First, the content of the memory 21 becomes "1" when gate 25 is opened in the presence of the "1" sign bit from terminal 84. Next, the content of the memory 20 is changed to "1" by the output "1" given from the detector 4. As a result, the output of the gate 24 is changed to "1" in response to the output "1" given from the memory 20, so that the occurrence of a net overflow may be indicated. The output of said sign bit memory 21 appears at the terminal 31 to indicate that the overflow is in the positive direction. In the accumulator 7 is stored the value of $P_2'$ shown in FIG. 1.

Next, the consecutive addition will be carried out at time 3, when a value a is added to $P_2'$ of the accumulator 7 as referred to in FIG. 1. At this time, as stated with respect to the first embodiment, the adder 5 is in a state of overflow in the negative direction, causing the detector 4 to indicate "1", and the terminal 84 to give an output "0". The states of the memories 20, 23, and 21 are consequently changed as follows. First, it should be noted that before any memory change takes place, gate 25 is closed in response to the output "1" from the memory 20 and the gate 22 is closed in response to the output "1" from the memory 21 and the output "0" from the terminal 84, so that the gate 26 is closed. Accordingly, each of the memories is changed in the following manner. The content of the memory 20 is reversed to "0" in response to the output "1" of said detector. Also, the content of memory 21 remains at "1" in response to the closed state of the gate 25, and the memory 23 remains at "0" since the gate 26 is closed. Consequently, since the outputs of the memories 20 and 23 are zero, the output of the gate 24 is zero to indicate the absence of net overflow and give the correct addition result.

Although the foregoing description concerns an instance in which a single overflow is compensated for, now will be considered a case in which another overflow occurs in the same direction in the final addition referred to above. More specifically, it is assumed now that another positive overflow arises at time $t_3$ rather than a compensating negative overflow, i.e. at the time of the second positive overflow the contents of memories 20 and 21 are both "1" and the content of the memory 23 remains at "0".

At this time point, the single overflow detector 4 gives an output "1". The gate 22 is opened by the output "1" of the memory 21 and the "1" output from the terminal 84 in response to said another overflow in the positive direction. The gate 26, consequently, becomes opened in response to the "1" outputs from the memory 20, the detector 4, and the gate 22, and the memory 23 is changed to 1. As a result, each memory content is changed as follows. At the time the "1" output first occurs from gate 4, the "1" outputs from memory 20 and the memory 23 are disabling gate 25 and, therefore, memory 21 remains at "1". When the detector 4 produces a "1", the memory 20 changes to "0" to indicate that an even number of overflows has occurred, but the gate 24 is open to indicate the occurrence of net overflow at the terminal 30 in response to the output "1" from the overflow memory 23. The "1" appearing at the terminal 31 reveals that the overflow occurred in the positive direction.

It is seen that, once said memory 23 is turned to "1", the gate 25 always remains closed and the memory 23 never returns to zero unless a signal is fed to the terminal 32. As a result, a "1" is continuously provided at the output of gate 24 regardless of the occurrence of further overflows in subsequent additions. As regards the direction of the indicated overflow, the terminal 31 remains a "1" to indicate that the overflow occurred in the positive direction, because the sign bit memory 21 is not rewritten by the closed gate 25.

As discussed above, by the use of only three flip-flops and several gates, the present invention indicates that the final result of the CA operation is free from overflow if any overflow that may occur in one direction in the course of the CA operation is followed by another in the opposite direction, and theoretically permits unlimited consecutive additions. Therefore, if this invention is applied to an arithmetic unit to achieve said digital signal processing, a stable second-order recursive digital filter can be achieved by merely adding a simple circuit without decreasing the data length of the arithmetic unit. Furthermore, since it theoretically permits unlimited consecutive additions, the invention is applicable to the operation of a non-recursive digital filter having many taps and can thereby serve to reduce errors attributable to overflowing. The invention can be also applied to solve any overflow problem in the CA operation by the use of a subtractor.

The difference between the first and second embodiments described above can be summarized as follows:

In the first embodiment, even though overflows consecutively occur in one direction up to the maximum value that can be handled by the counter, the ultimate result of the additions will still be free from overflow error if the result of the calculation returns to the dynamic range of $(-1, +1)$ by the end of the CA operation, but the number of the consecutive additions is limited by said maximum value.

In the second embodiment, if two overflows consecutively occur in the same direction, they will be recognized as such irrespective of the final result as well as of the number of the consecutive additions. Thus, in this embodiment, it is only when overflows occurring in the positive direction are interleaved with overflows in the negative direction that the final result is free from overflow even if any overflow arises during the CA operation. The final result is therefore free from overflow only when the number of the overflows that has occurred is even. However, not to limit the number of the consecutive additions, consecutive overflows in one direction are recognized as such irrespective of the final result. In spite of this restriction, in digital filters or the like so designed that the average level of output signals, which are the results of the CA operation, comes within a dynamic range of $(-1, +1)$, there presumably is little probability of two consecutive overflows occurring in the same direction during the CA operation.

What is claimed is:

1. In an arithmetic circuit of the type for performing an arithmetic operation comprising a plurality of consecutive internal addition or subtraction operations, said circuit including a calculating means for receiving first and second inputs represented in two's complement-fixed point and adding or subtracting said inputs to provide an output and accumulator means for receiving and storing said calculating means output, the content of said accumulator means being provided as said second input and said first input being externally supplied, whereby said arithmetic circuit performs consecutive additions or subtractions in response to consecutive externally supplied first inputs, said circuit further comprising:
    overflow occurrence detection means for providing an overflow occurrence signal output each time an overflow occurs in one of said internal operations;
    overflow direction detection means for providing an overflow direction signal output indicating the direction of each said overflow; and
    overflow monitoring means responsive to said overflow occurrence and overflow direction signals for offsetting positive and negative overflows against one another, said overflow monitoring means providing a net overflow occurrence signal and a net overflow direction signal indicating the occurrence and direction of a net overflow if an unequal number of positive and negative overflows has occurred during said arithmetic operation, said overflow monitoring means providing no net overflow occurrence signal if an even number of alternately occurring positive and negative overflows has occurred during said arithmetic operation.

2. An arithmetic circuit as defined in claim 1, wherein said overflow monitoring means comprises:
    counting means responsive to said overflow occurrence and overflow direction signals for counting said overflow occurrence signals in a direction determined by said overflow direction signal;
    resetting means for resetting said counter to a zero value at the beginning of said arithmetic operation;
    zero detecting means for providing said net overflow occurrence signal when the content of said counter is non-zero; and sign indicating means responsive to the most significant bit in said counter for providing said net overflow direction signal;
    whereby said overflow monitoring means provides said net overflow occurrence and net overflow direction signals only when an unequal number of positive and negative overflows has occurred during said arithmetic operation and will not provide said net overflow occurrence signal if an equal number of positive and negative overflows has occurred even though two consecutive overflows may occur in the same direction.

3. An arithmetic circuit as defined in claim 1, wherein said overflow monitoring means comprises:
    first memory means responsive to said overflow occurrence signals for indicating whether the number of overflows is even or odd;
    overflow direction memory means for memorizing the direction of overflow each time an overflow occurs and said first memory means is indicating an even number of overflows and when no overflow signal is provided;
    overflow memory means for storing a net overflow signal and providing said overflow signal in response to said overflow occurrence signal when said first memory means is indicating an odd number of overflows and said direction stored in said direction memory is the same as said overflow direction signal;
    prohibiting means responsive to an overflow signal stored in said overflow memory for prohibiting the alteration of the contents of said overflow direction memory means;
    net overflow detection means for providing said net overflow signal in response to either an overflow signal from said overflow memory or an odd signal from said first memory; and
    clearing means for clearing said first memory, direction memory and overflow memory at the beginning of said arithmetic operation;
    whereby said overflow monitoring means provides said net overflow signal if an unequal number of positive and negative overflows has occurred during said arithmetic operation or if an equal number of positive and negative overflows has occurred but two consecutive overflows have the same direction, the output of said direction memory means comprising said net overflow direction signal.

4. An arithmetic unit as defined in any one of claims 1, 2 or 3, wherein said overflow direction signal comprises the most significant bit of said calculating means output.

5. An arithmetic unit as defined in any one of claims 1, 2 or 3, wherein said calculating means includes a plurality of stages each having a carry-over output terminal, and said overflow occurrence detection means comprises an Exclusive OR (EOR) gate having first and second inputs coupled to the carry over output terminals of the two most significant bit stages of said calculating means.

6. An arithmetic circuit as defined in claim 3, wherein said direction memory means comprises a D-type flip-flop.

7. An arithmetic circuit as defined in claim 3, wherein said overflow memory means comprises an R-S type flip-flop.

* * * * *

UNITED STATES PATENT AND TRADEMARK OFFICE
CERTIFICATE OF CORRECTION

PATENT NO. : 4,379,338

DATED : April 5, 1983

INVENTOR(S) : Nishitani et al

It is certified that error appears in the above-identified patent and that said Letters Patent is hereby corrected as shown below:

Column 3, line 16 - change "dealth" to --dealt--;

5, line 37 - change "x" (both occurrences) to --$\underline{x}$--;

5, line 45 - change "a" to --$\underline{a}$--;

5, line 47 - change "fivebit" to --five-bit--;

5, line 50 - change "a" to --$\underline{a}$--;

Column 7, line 9 - change "x+a" to --$\underline{x}$+$\underline{a}$--;

7, line 37 - change "x" to --$\underline{x}$--;

7, line 40 - change "x" to --$\underline{x}$ --;

7, line 46 - change "x" to --$\underline{x}$--;

8, line 10 - change "value a" to --value $\underline{a}$--;

8, line 11 - change "a" to --$\underline{a}$--;

UNITED STATES PATENT AND TRADEMARK OFFICE
CERTIFICATE OF CORRECTION

PATENT NO. : 4,379,338

DATED : April 5, 1983

INVENTOR(S) : Nishitani et al

It is certified that error appears in the above-identified patent and that said Letters Patent is hereby corrected as shown below:

Column 8, line 27 - change "suppled" to --supplied--;

Column 9, line 44 - chante "x" to --$\underline{x}$--;

Column 10, line 2 - change "value a" to --value $\underline{a}$--.

Signed and Sealed this

Twenty-sixth Day of July 1983.

[SEAL]

Attest:

GERALD J. MOSSINGHOFF

*Attesting Officer*   *Commissioner of Patents and Trademarks*